Jan. 20, 1970   J. F. KIRK   3,490,626
MOBILE UNIT WITH REMOVABLE RECEPTACLE FOR TRANSPORTING ARTICLES
Filed Oct. 26, 1967   2 Sheets-Sheet 1

INVENTOR
JAMES F. KIRK

BY Browne, Schuyler & Beveridge
ATTORNEYS

INVENTOR
JAMES F. KIRK
BY Browne, Schuyler & Beveridge
ATTORNEYS

United States Patent Office 3,490,626
Patented Jan. 20, 1970

3,490,626
MOBILE UNIT WITH REMOVABLE RECEPTACLE FOR TRANSPORTING ARTICLES
James F. Kirk, Washington, D.C., assignor to D. C. Transit System, Inc., Washington, D.C., a corporation of the District of Columbia
Filed Oct. 26, 1967, Ser. No. 678,327
Int. Cl. B60p 1/52, 1/64; B65j 1/22
U.S. Cl. 214—84      4 Claims

ABSTRACT OF THE DISCLOSURE

A mobile unit such as a trailer having a flat deck with at least one pair of spaced guide rails for receiving corresponding guide members on a receptacle to position the receptacle on the deck as well as to guide movement of the receptacle across the deck during loading and unloading. A plurality of rollers mounted on the bottom of the receptacle further facilitates movement of the receptacle on the deck. To secure the receptacle in position on the deck for transportation, there is provided a manually operated lock mechanism including a locking pin mounted on the deck for movement between an extended position engaging a portion of the receptacle to lock it in place and a retracted position releasing the receptacle for movement off the deck.

SUMMARY OF INVENTION

The present invention generally relates to the transportation of articles on mobile units such as trailers with the articles being received in a storage bin or receptacle that is secured on the mobile unit during transportation.

One of the objects of the present invention is to provide a mobile unit and associated article receptacle which highly facilitate loading and unloading of the receptacle with respect to the mobile unit.

A further object of the present invention is to provide such a mobile unit and receptacle by which the receptacle may be easily positioned and then locked in place against movement on the mobile unit for transportation.

A further object of the present invention is to provide an improved and efficient receptacle arrangement on a mobile unit.

A still further object is to provide such a mobile unit and receptacle which will attain the above objects while being relatively economical to produce either anew or as modifications of existing or conventional structures.

On embodiment of the invention achieving the above objects is incorporated in a wheeled trailer that may be hitched to the back of a motor vehicle. The trailer is formed with a flat platform or deck having a plurality of pairs of guide rails extending transversely across the deck to define guideways which receive guide members fixed to the underside of one or more receptacles which are slid over the deck surface transversely thereof from opposite sides of the trailer during loading and unloading. On the bottom of each receptacle, groups of rollers are rotatably mounted to engage the trailer deck to facilitate movement of the receptacle during loading and unloading.

Once loaded, the receptacles are locked in position against movement on the deck by a lock mechanism associated with each receptacle. The lock mechanism includes at least one locking pin movable between an extended position engaging a locking member fixed with respect to an associated receptacle to lock the receptacle in place, and a retracted position spaced from the locking member to release the receptacle. Actuation of the locking pin is through a crank disc rotatably mounted on the deck and operatively connected to the locking pin to retract the same when rotated in one direction and to extend the same when rotated in the opposite direction. A handle connected to the disc is employed to rotate the disc to lock or unlock the receptacle.

Other objects and advantages of the present invention as will be apparent from the following more detailed description taken in conjunction with the associated drawings in which.

DETAILED DESCRIPTION

Figure 1:
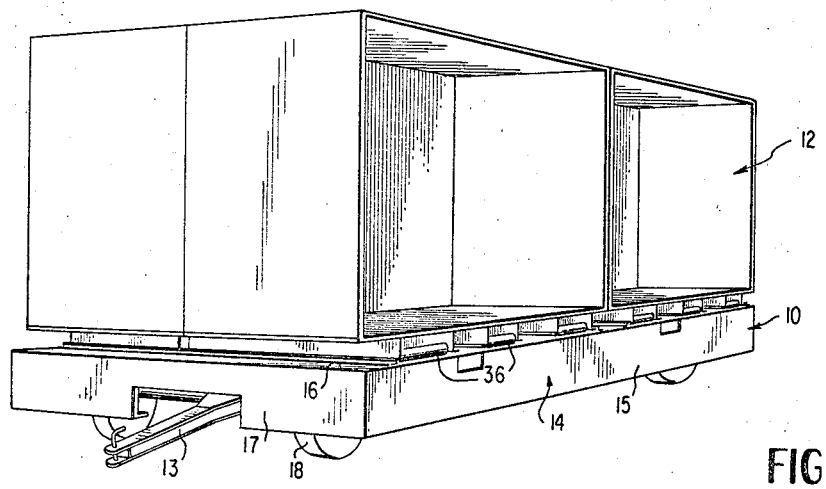
FIG. 1 is a perspective view of a trailer loaded with a plurality of article receptacles in accordance with the present invention.
Figure 2:
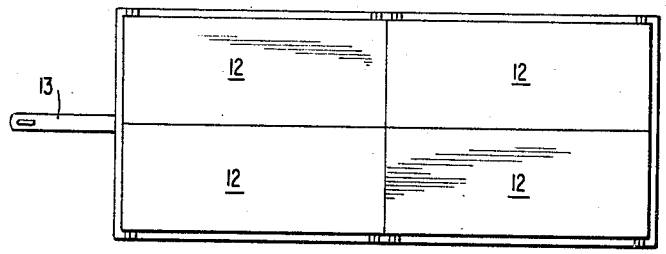
FIG. 2 is a plan view of the receptacle and trailer structures shown in FIG. 1.

Referring to the drawings in detail, there is shown one embodiment of the present invention including a trailer generally designated 10 and a plurality of article receptacles 12 receivable on the trailer for transportation behind any suitable motor vehicle (not shown) which may be attached to the trailer by means of a hitch 13. The shown trailer 10 has a generally rectangular body 14 including an upper flat platform or deck 16 supported on conventional front and rear wheel and axle assemblies generally designated 18. The body frame includes longitudinally and transversely extending steel channel members 22 and 24 while the sides and ends of the body are formed by flat generally rectangular panels 15 and 17.

Receptacles 12 are dimensioned to hold various articles, goods or other items for shipment on the trailer. In the shown embodiment, there are four receptacles, generally box-like in shape, and which are placed on the trailer with the open side facing laterally outwardly of the trailer as shown in FIG. 1. It will be readily appreciated that other receptacle configurations may be employed in carrying out the present invention.

Figure 3:
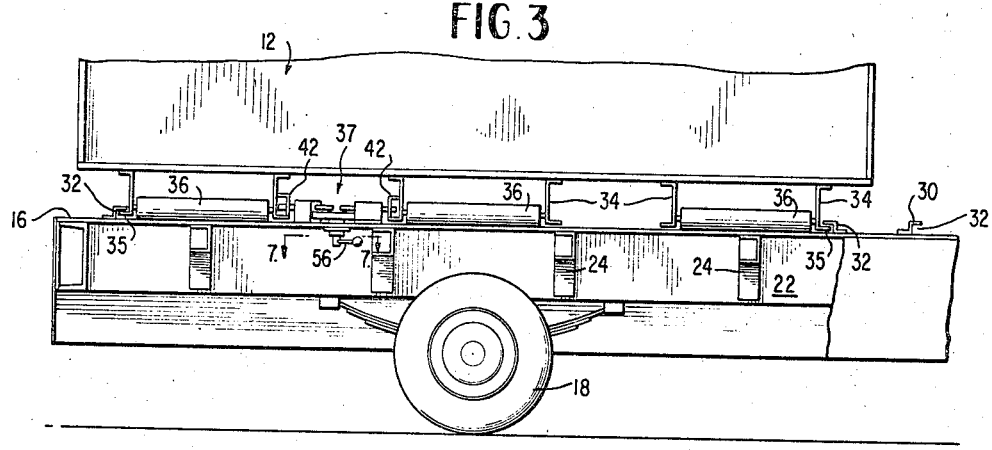
FIG. 3 is a fragmental, side elevational view of the trailer and receptacle structures.
Figure 4:
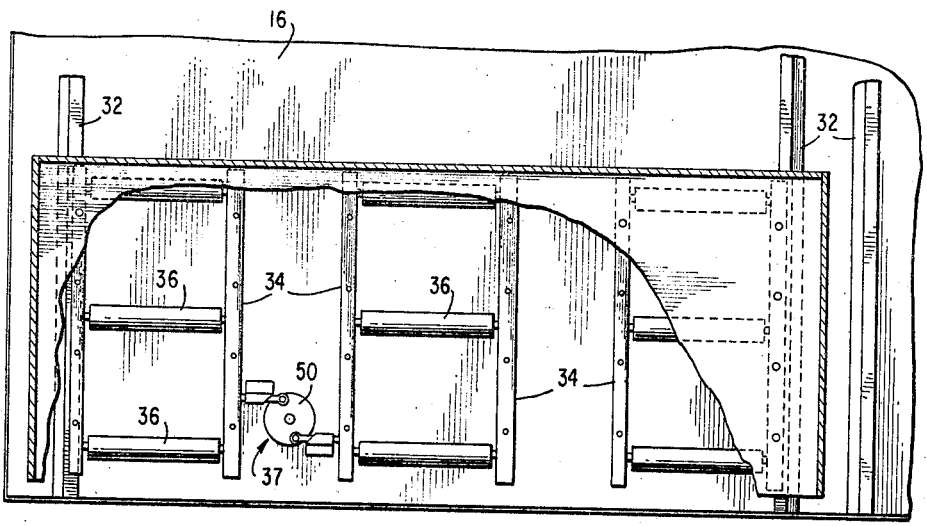
FIG. 4 is an enlarged, fragmental, plan view showing portions of the trailer deck and portions of associated bottom parts of the receptacle.
Figure 5:
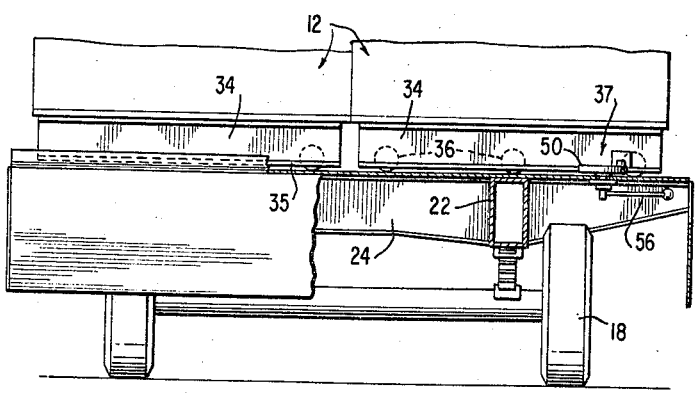
FIG. 5 is a fragmental, rear end view with certain portions shown in cross-section.

To guide and position the receptacles during loading on the trailer, the trailer deck 16 is provided with a plurality of pairs of guide rails 30 extending transversely across the deck to define guideways 32. Each pair of guideways are dimensioned to receive a corresponding pair of guide members 34 attached to the underside of one of the receptacles. Guide rails 32 and guide members 34 may be formed from elongated structural steel channels. Guide rails 32 have a generally Z-shape cross-section while guide members 34 have a generally U-shape cross-section with the bottom flanges 35 thereof dimensioned to be received in the guideways 32, as shown in FIG. 3. Any suitable fastening method such as by bolting may be employed to fasten guide rails 32 and guide members 34 to the trailer deck and receptacles respectively. In the particular embodiment disclosed, there are two pairs of guide rails 30 each pair receiving two receptacles from the opposite sides of the trailer. Once guide members 34 are received in guide rails 32 the latter prevent the receptacles from moving vertically and also longitudinally relative to the trailer. Transverse movement of the receptacles is prevented by a lock mechanism generally designated 37 as will be described hereinafter.

In loading and unloading the receptacles, guide members 34 slide through guide rails 30, and to facilitate movement of the receptacles, a plurality of rollers 36 are rotatably mounted on the underside of the receptacles to engage trailer deck 16. Rollers 36 may be provided in groups, there being three groups shown for each receptacle with each group including three rollers. Preferably rollers 36 are mounted in the sides of channels 34 which form the guide members.

Figure 6:
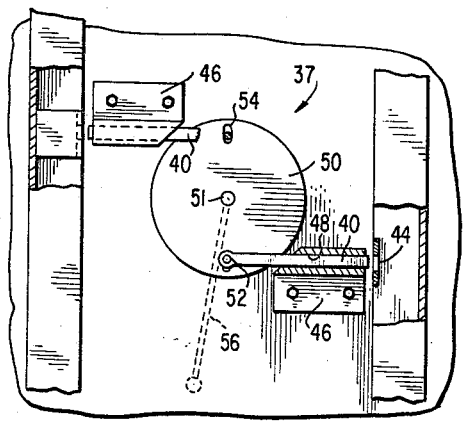
FIG. 6 is an enlarged, fragmental, plan view illustrating a lock mechanism employed to secure a receptacle on the trailer.

Referring to FIG. 6, each lock mechanism 37 includes a pair of opposed pins 40 movable between an extended position in apertures 44 of locking members 42 which are rigidly attached to adjacent channels 34, and a retracted position spaced from locking members 42. Locking pins 40 are mounted for this movement in brackets 46 bolted to the trailer deck 16 and having barrels 48 dimensioned to slidably receive pins 40 as shown in FIG. 6. Thus locking pins 40 move in planes parallel to the trailer deck between their extended positions in which they lock the receptacles against movement and retracted positions wherein they release the receptacles for unloading from the trailer deck.

Actuation of each pair of locking pins 40 in the embodiment shown, is obtained through a crank disc 50 mounted for rotation on the deck by means of a shaft 51 rigidly fixed to the center of the disc and depending therefrom through the trailer deck. The inner extremities of locking pins 40 are operatively connected to diametrically opposed portions of disc 50 by wrist pins 52 extending through locking pins 40 and into elongated slots 54 radially formed in disc 50. As viewed in FIG. 6, it will be seen that clockwise rotation of disc 50 will retract locking pins 40 while counterclockwise rotation will extend them to secure the associated receptacle in place on the trailer deck. Below the deck, an operating handle 56 is rigidly secured to the lower end of shaft 51 for manual operation of the disc 50.

Figure 7:
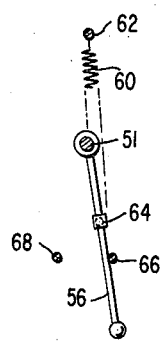
FIG. 7 is a modification of the lock mechanism taken generally along lines 7—7 of FIG. 3.

In the preferred embodiment, a biasing mechanism is employed to retain the operation handle 56 in opposite angular positions wherein the pins 40 are extended and retracted. Referring to FIG. 7 this means includes an over-center spring arrangement including a tension spring 60 having one end anchored at 62 to the trailer body and an opposite end secured such as at 64 to handle 56 intermediate the ends thereof. Anchoring point 62 is in alignment with shaft 51 so that handle 56 will be biased in both opposite angular positions below the trailer deck; the opposite positions being governed by stops 66 and 68 suitably fixed to the trailer body.

In use, if it is desired to load the trailer with the receptacles, plunger pins 40 are first retracted by rotating crank disc 50 clockwise. The receptacles are then placed on the trailer deck by inserting guide flanges 35 in guideways 32 and then sliding the receptacles transversely across the deck with the aid of rollers 36. After each receptacle is moved into the proper position on the trailer, crank disc is rotated counterclockwise to extend the locking pins 40 in apertures 44 of locking members 42 to thereby positively secure the receptacle against movement on the trailer deck. The receptacles may then be transported on the trailer as desired.

Although the present invention has been described in conjunction with a trailer, it will be readily understood that it may be incorporated in other vehicles with or without self contained power units.

Modifications and adaptations of the present invention readily apparent from the foregoing description and associated drawings, although not specifically mentioned herein, will nevertheless be included within the scope of the present invention.

What is claimed is:
1. In combination with a mobile unit having a platform and means for supporting it for movement over a surface of travel; a storage receptacle formed separately from the mobile unit and dimensioned to be received on the platform, said receptacle having bearing means engageable with the platform, and locking means on the mobile unit and receptacle for releasably securing the receptacle on the platform, said locking means including a locking member fixed with respect to the receptacle, a locking pin mounted with respect to the platform for movement between an extended position engaging the locking member and a retracted position spaced from the locking member, actuating means for moving the locking pin between its extended and retracted positions, said actuating means including a crank member rotatably mounted on the platform and operatively connected to the locking pin to extend or retract the same upon rotation of he crank member, a manually operable handle connected to the crank member to rotate the same, and an over center spring biasing means urging the handle in opposite extreme angular positions.

2. In combination, a mobile unit having a platform and means for supporting it for movement over a surface of travel, a plurality of pairs of parallel guide rails fixed to the platform and extending transversely across the platform between the opposite sides thereof, at least two receptacles mounted on the platform, said receptacles having elongated guide members secured to the bottom portions thereof and received in said guide rails on the platform, said receptacles having a plurality of rollers located between the guide rails and mounted for rotation in the guide members of the receptacles for facilitating movement of the receptacles over the platform, and a lock mechanism permanently mounted on the platform between two adjacent guide rails on the platform, said lock mechanism including a pair of oppositely directed pins dimensioned to be extended through apertures in adjacent guide rails to lock the receptacles with respect to the platform and to be retracted from said guide rails to release the receptacles with respect to the platform, and a manually operable means situated adjacent one side of the platform for simultaneously operating said pins between extended and retracted positions.

3. The combination defined in claim 2 wherein each receptacle has a plurality of pairs of guide members and a plurality of sets of rollers mounted in said pairs of guide members respectively.

4. The combination defined in claim 2 wherein the receptacles have open sides and are mounted on the platform in back to back relationship with their open sides facing laterally outwardly in opposite directions.

References Cited

UNITED STATES PATENTS

| | | |
|---|---|---|
| 1,410,935 | 3/1922 | Lazareth. |
| 1,676,072 | 7/1928 | Brockway. |
| 1,862,632 | 6/1932 | Perin. |
| 2,223,275 | 11/1940 | Valenzuela. |
| 2,351,314 | 6/1944 | Ario. |
| 2,538,531 | 1/1951 | Likens. |
| 2,858,774 | 11/1958 | Batten. |

FOREIGN PATENTS

| | | |
|---|---|---|
| 122,047 | 6/1948 | Sweden. |

ALBERT J. MAKAY, Primary Examiner

U.S. Cl. X.R.

296—35